US008006137B2

(12) United States Patent
Lee et al.

(10) Patent No.: US 8,006,137 B2
(45) Date of Patent: Aug. 23, 2011

(54) COMPUTER DEBUG METHOD

(75) Inventors: Yuan-Chan Lee, Taipei Hsien (TW);
Fu-Jyu Guo, Taipei Hsien (TW);
Chen-Chang Fan, Taipei Hsien (TW)

(73) Assignee: Wistron Corp., Hsichih, Taipei Hsien (TW)

( * ) Notice: Subject to any disclaimer, the term of this patent is extended or adjusted under 35 U.S.C. 154(b) by 13 days.

(21) Appl. No.: 12/576,625

(22) Filed: Oct. 9, 2009

(65) Prior Publication Data

US 2010/0223503 A1 Sep. 2, 2010

(30) Foreign Application Priority Data

Mar. 2, 2009 (TW) .............................. 98106731 A

(51) Int. Cl.
*G06F 11/00* (2006.01)
(52) U.S. Cl. ............... 714/36; 714/46; 714/57
(58) Field of Classification Search .............. 714/25, 714/36, 46, 47, 48, 57
See application file for complete search history.

(56) References Cited

U.S. PATENT DOCUMENTS

| 3,825,255 A * | 7/1974 | Kennard et al. ............... 273/139 |
| 4,206,920 A * | 6/1980 | Weatherford et al. .......... 463/18 |
| 4,375,666 A * | 3/1983 | Buck et al. ...................... 463/10 |
| 5,344,199 A * | 9/1994 | Carstens et al. ................ 463/17 |
| 6,463,550 B1 * | 10/2002 | Cepulis et al. .................. 714/25 |
| 6,807,629 B1 * | 10/2004 | Billick et al. ..................... 713/2 |
| 6,910,157 B1 * | 6/2005 | Park et al. ....................... 714/36 |
| 7,315,962 B2 * | 1/2008 | Neuman et al. ................. 714/36 |
| 2003/0163765 A1 * | 8/2003 | Eckardt et al. ................. 714/36 |
| 2005/0172038 A1 * | 8/2005 | Biggs et al. ....................... 710/1 |
| 2006/0095224 A1 * | 5/2006 | Lambert ....................... 702/122 |
| 2006/0236087 A1 * | 10/2006 | Ha .................................. 713/2 |
| 2007/0239976 A1 * | 10/2007 | Huang ............................ 713/1 |
| 2010/0107011 A1 * | 4/2010 | Wu ................................ 714/36 |

* cited by examiner

*Primary Examiner* — Robert Beausoliel, Jr.
*Assistant Examiner* — Joseph D Manoskey
(74) *Attorney, Agent, or Firm* — Muncy, Geissler, Olds & Lowe, PLLC

(57) ABSTRACT

A computer debug method includes following steps: a Power-On Self Test (POST) is started; several function tests of the POST are executed respectively, wherein at least one set of codes corresponding to each following executing function test is stored in a memory before executing each of the function tests; when the POST is interrupted, wait for a user to input a guess signal through an input device; compare the set of stored codes in the memory with the guess signal; a signal representing that the set of stored codes in the memory equals to the guess signal is output if the set of stored codes in the memory equals to the guess signal.

9 Claims, 4 Drawing Sheets

COMPUTER DEBUG METHOD

RELATED APPLICATIONS

This application claims priority to Taiwan Application Serial Number 98106731, filed Mar. 2, 2009, which is herein incorporated by reference.

BACKGROUND

1. Field of Invention

The present invention relates to a debug method. More particularly, the present invention relates to a computer debug method.

2. Description of Related Art

During the computer initiation procedure, several function tests of a Power-On Self Test (POST) are executed from the Basic Input/Output System (BIOS) to identify and test devices in the computer. After executing the function tests, the debug information, for example a POST Code message, generated by the POST is stored on port 80. Then, the debug information is obtained from port 80 and displayed on several seven-segment light emitting diodes (LEDs) for debugging. For example, in the prior art, when a computer is determined normal, POST Codes "FF" are displayed on two seven-segment LEDs of the computer in the prior art.

When debugging a Notebook (NB), a debug card with seven-segment LEDs is needed to be installed on a port of the NB, such as a Mini-PCI-E port, for displaying debug information. However, users may not buy a debug card for NB-debugging. Therefore, if the NB breaks down, users can't find out the breakdown reason themselves and can only send the NB back to the manufacturer, which may disturb users.

SUMMARY

A computer debug method is provided. According to one embodiment of this invention, the computer debug method includes following steps: a Power-On Self Test (POST) is started. Several function tests of the POST are executed respectively, wherein at least one set of codes corresponding to each following executing function test is stored in a memory before executing each of the function tests. When the POST is interrupted, wait for a user to input a guess signal through an input device. Compare the set of stored codes in the memory with the guess signal. A signal representing that the set of stored codes in the memory equals to the guess signal is output if the set of stored is codes in the memory equals to the guess signal.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
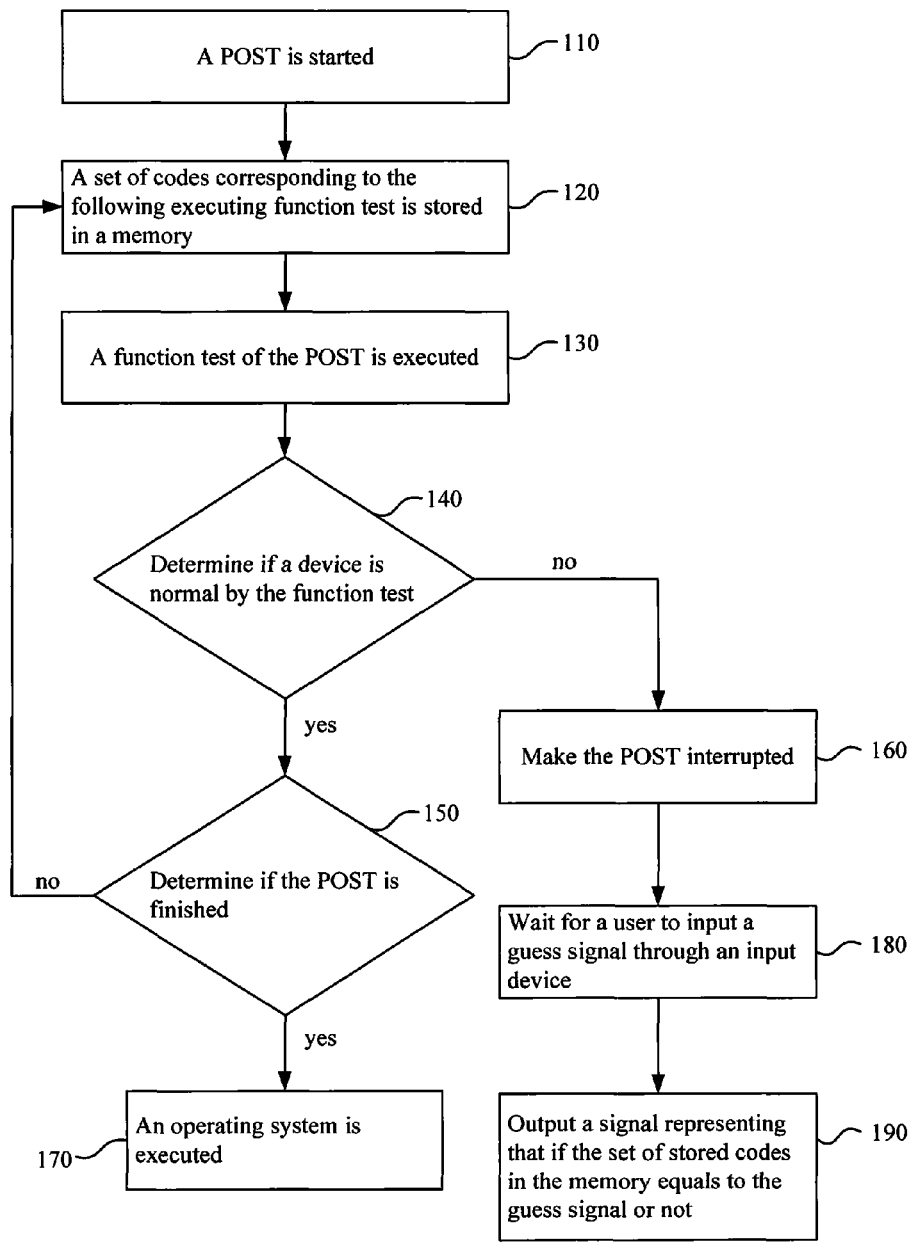
FIG. 1 is a flow diagram of a computer debug method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a flow diagram of a computer debug method according to one embodiment of this invention. In the computer debug method, users input guess signals through an input device to obtain codes or device information corresponding to previously executed function tests of Power-On Self Test (POST). The computer debug method 100 includes the following steps:

In step 110, a POST is started. Wherein, the POST may test Central Processing Unit (CPU), display card, memory, hard drive, optical drive, chip set, keyboard and any other device of a computer. Each function test of the POST may be assigned to a specified set of codes respectively. In addition, a same function test of the POST may be assigned to different set of codes as the designer of the POST differs.

During the POST, a function test of the POST is executed (step 130) to determine if a device of the computer is normal by the function test (step 140). Wherein, a set of codes corresponding to the following executing function test is stored in a memory (step 120) before executing the function test (step 130). POST Codes may be utilized as the set of codes corresponding to the function test, and Non-volatile random access memory (NVRAM) or any other memory may be utilized to store the set of codes corresponding to the function test (step 120).

When the device is determined normal by the function test, determine if the POST is finished (step 150). When the POST is not finished, execute the next function test of the POST through step 120~step 140. Therefore, several function tests of the POST can be executed respectively to test devices of the computer through step 120~step 150. When the POST is finished, an operating system is executed (step 170). Wherein the POST finished without interruption implies that devices of the computer are normal and at least one set of stored codes in the memory are not needed anymore. Therefore, the at least one set of stored codes in the memory can be cleared before executing the operating system (step 170)

When the device is determined broken by the function test, make the POST interrupted (step 160) and wait for a user to input a guess signal through an input device (step 180). The input device may be a keyboard, a touch screen or any other input device. Then, output a signal representing that if the set of stored codes in the memory equals to the guess signal or not (step 190). The signal representing that if the set of stored codes in the memory equals to the guess signal or not may be sound made by a speaker of the computer or a light generated by a light of a computer, such as a hard drive (HDD) light, a power light, a backlight module of a liquid crystal display (LCD) or any other light of the computer. Therefore, the user can debug the computer according to this invention.

When set number of the at least one set of stored codes is more than one, select one of the sets of stored codes according to a select signal received from the input device. Then wait for the user to input the guess signal through the input device (step 180), and output a signal representing that if the selected set of stored codes in the memory equals to the guess signal or not (step 190). Therefore, if the set of stored codes in the memory equals to the guess signal, users can have the information that which function of the computer is broken according to the guess signal.

The POST Code, which is often utilized as the set of codes corresponding to the function test, is a 2 hex digit code. Therefore, in an embodiment of this invention, before waiting for the user to input the guess signal through the input device (step 180), the set of stored codes in the memory can be converted into an 8 binary digit code. Then, if a keyboard is applied as the input device, 8 keys of the keyboard can be assigned to generate different guess signals respectively after pressed, and each guess signal generated by one of the 8 keys corresponds to a specified digit of the transformed code. In detail, when a guess signal generated by one of the 8 keys corresponding to a digit with value "1" is pressed, a signal representing that the set of stored codes in the memory equals to the guess signal is output to notice the user that the value of the digit corresponding to the pressed key equals to "1". For example, F1~F8 of the keyboard can be assigned to correspond to $1^{st}$~$8^{th}$ digits of the set of stored codes and generate different guess signals respectively. When the set of stored codes in the memory is "1F", "1F" can be converted into "00011111". As mentioned above, F4, F5, F6, F7 and F8 correspond to the digits with value "1" in "00011111" (or "1F" as well). Therefore, after waiting for the user pressing F4, F5, F6, F7 and F8 to input the guess signal (step 180) respectively, the signal representing that the set of stored codes in the memory equals to the guess signal is output (step 190) to notice the user that F4, F5, F6, F7 and F8 correspond to the set of stored codes "1F". Then, the user can debug the computer by looking for the manual with the set of stored codes "1F".

In another embodiment, each guess signal generated by the input device can be assigned to a specified device of the computer. For example, if a keyboard is applied as the input device, key "c" of the keyboard can be utilized as the set of codes for CPU related function tests. In other words, when the set of stored codes in the memory corresponds to a CPU related function test, wait for the user to press key "c" to input the guess signal (step 180). Then, when the user presses key "c", a signal representing that the set of stored codes in the memory equals to the guess signal is output (step 190) to notice the user that the set of stored codes corresponding to a CPU related function test. Therefore, the user may debug the CPU of the computer.

Figure 2:
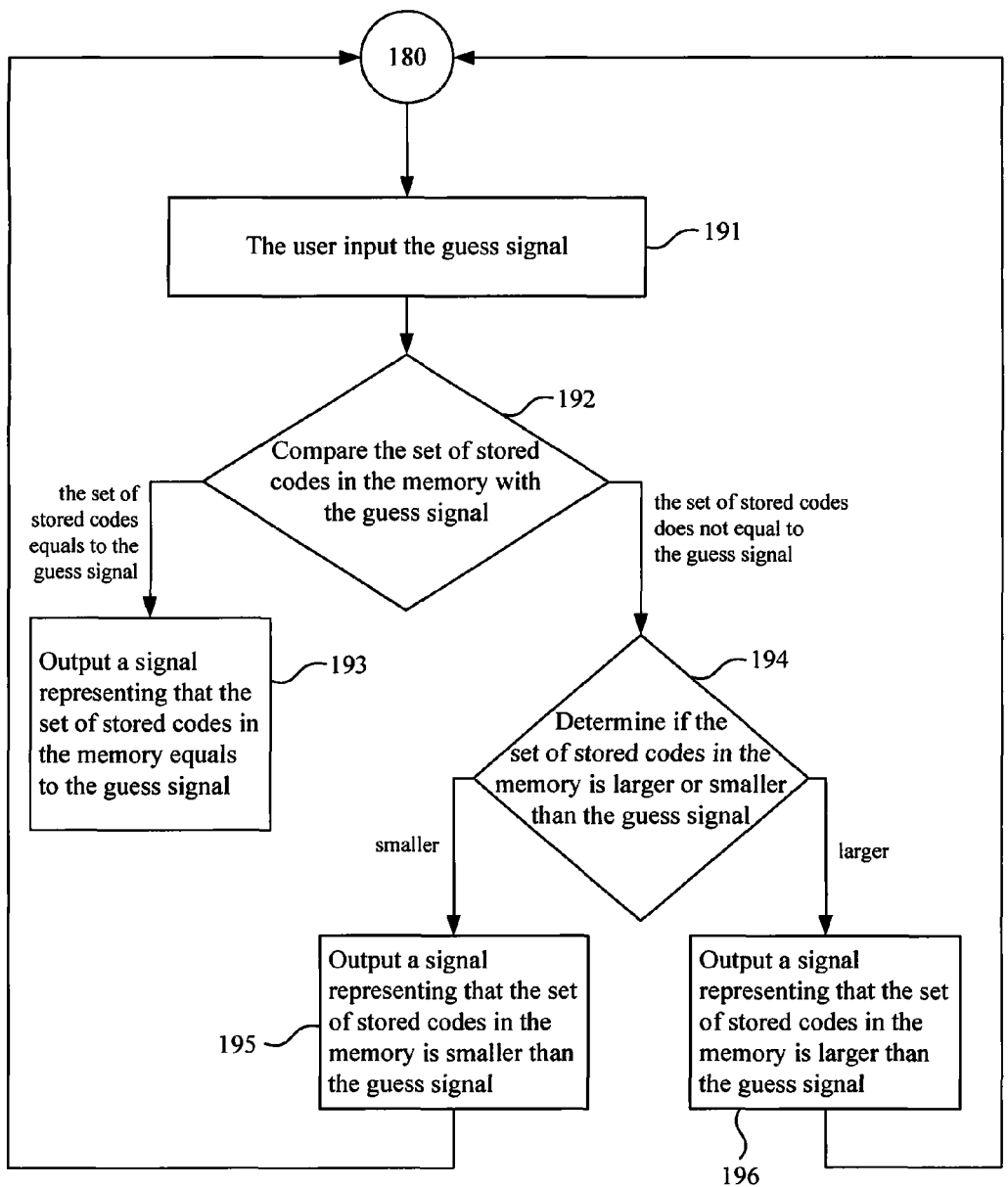
FIG. 2 is an embodiment of step 180 and step 190 in FIG. 1.

In addition, binary search can be utilized to help the user obtain the at least one set of stored codes in the memory according to the guess signal. FIG. 2 is an embodiment of step 180 and step 190 in FIG. 1. In step 180, wait for a user to input the guess signal through the input device. Then, after the user inputs the guess signal (step 191), compare the set of stored codes in the memory with the guess signal (step 192).

In the step 193, if the set of stored codes equals to the guess signal, output a signal representing that the set of stored codes in the memory equals to the guess signal. In the step 194, if the set of stored codes does not equal to the guess signal, determine if the set of stored codes in the memory is larger or smaller than the guess signal. In other embodiment, if the set of stored codes does not equal to the guess signal, a signal representing that the set of stored codes in the memory does not equal to the guess signal may be output to notice the user that the set of stored codes in the memory does not equal to is the guess signal.

If the set of stored codes in the memory is smaller than the guess signal, output a signal representing the set of stored codes in the memory is smaller than the stored codes (step 195) to inform the user that the set of stored codes in the memory is smaller than the guess signal, which the user input. Then, keep waiting for the user to input a next guess signal through the input device (step 180). Therefore, the user may then input a guess signal smaller than the previous one for further comparing with the set of stored codes in the memory.

If the set of stored codes in the memory is larger than the guess signal, output a signal representing the set of stored codes in the memory is larger than the stored codes (step 196) to inform the user that the set of stored codes in the memory is larger than the guess signal, which the user input. Then, keep waiting for the user to input a next guess signal through the input device (step 180). Therefore, the user may then input a guess signal larger than the previous one for further comparing with the set of stored codes in the memory. In addition, through step 194~step 196, binary search can be utilized to help the user input the guess signal equal to the set of stored codes according to the signal representing the set of stored codes is larger or smaller than the stored codes.

Figure 3:
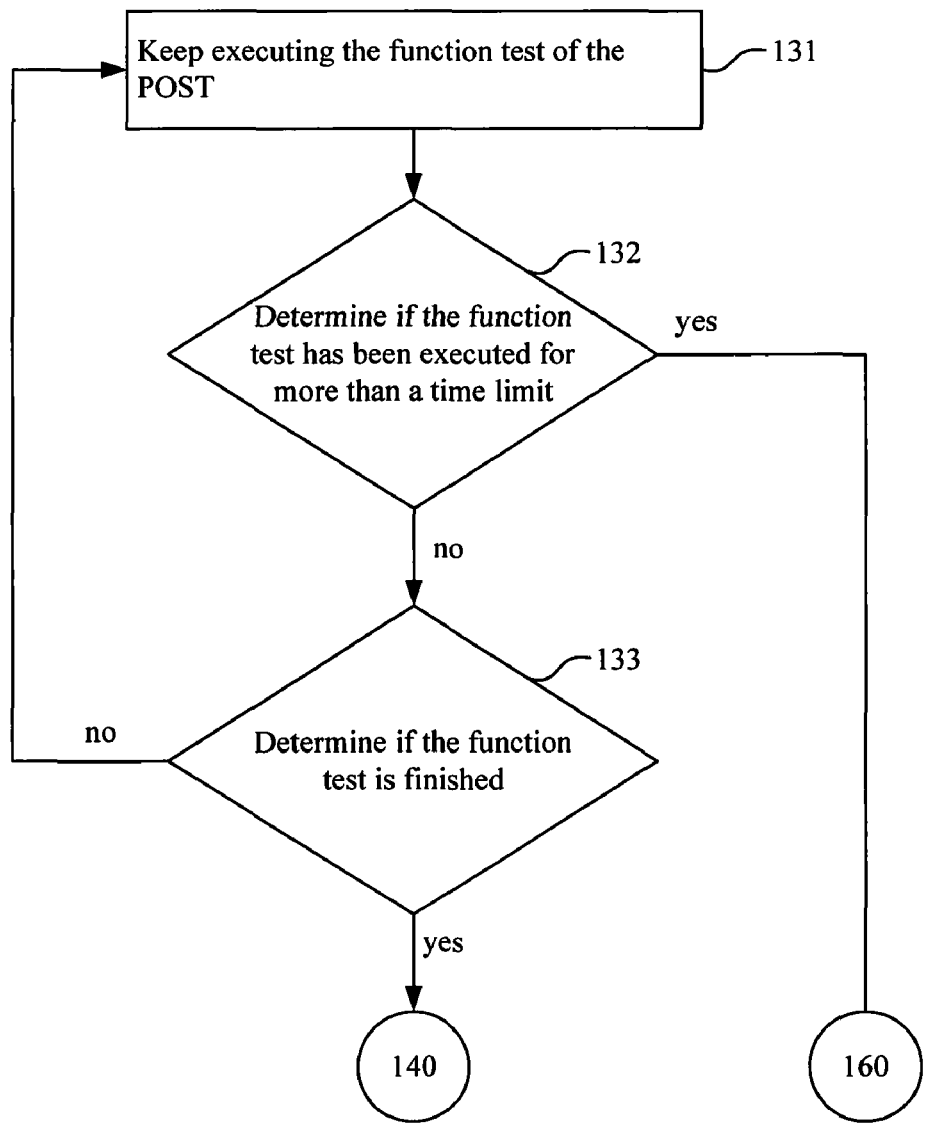
FIG. 3 is an embodiment of executing the function test (step 130) in FIG. 1.

FIG. 3 is an embodiment of executing the function test (step 130) in FIG. 1. When the function test is executed (step 130) for more than the time limit, a device tested by the function test may be broken, which can also be debugged utilizing the computer debug method 100. Therefore, executing the function test (step 130) may include following steps:

In step 131, keep executing the function test of the POST. Then, determine if the function test has been executed for more than a time limit (step 132). When the function test has not been executed for more than the time limit, determine if the function test is finished (step 133). When the function test is not finished, keep executing function test of the POST (step 131). When the function test is finished, determine if a device of a computer is normal by the function test (step 140).

When the function test has been executed for more than the time limit, make the POST be interrupted (step 160). Then, the at least one set of stored codes in the memory can be obtained through step 180 and step 190 in FIG. 1. Therefore, when a device of the computer is broken, which causes the function test been executed for a long time without response, the step 160, step 180 and step 190 can be utilized to determine the broken reason of the computer. In other embodiments, if a function test has been executed for a long time without response, which is caused by other reasons, the computer debug method 100 can also be applied for debugging.

Figure 4:
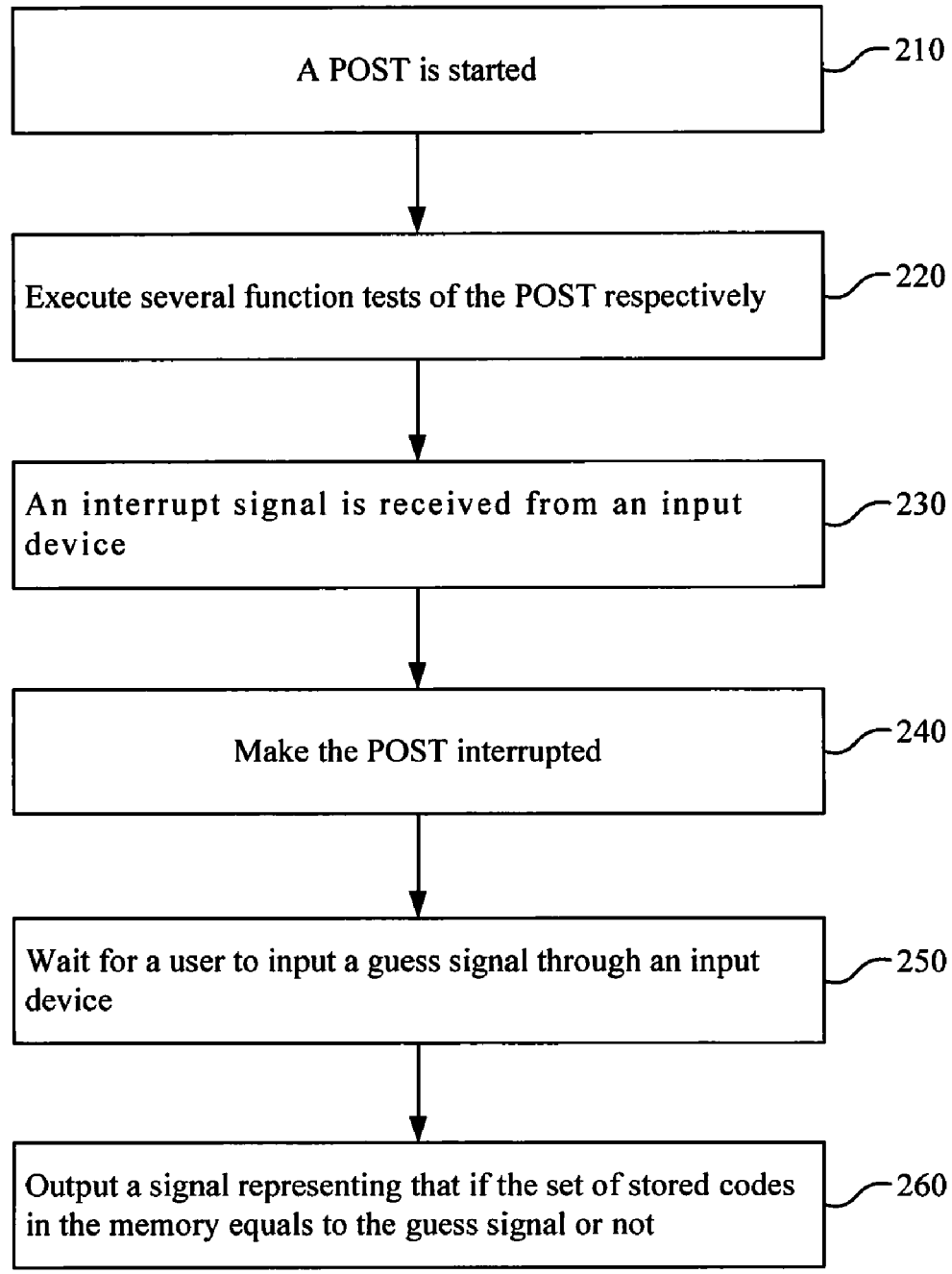
FIG. 4 is a flow diagram of a computer debug method according to another embodiment of this invention.

FIG. 4 is a flow diagram of a computer debug method according to another embodiment of this invention. In the computer debug method, users can interrupt POST by inputting an interrupt signal through an input device, and then input guess signals through an input device to obtain codes or device information corresponding to previously executed function tests of POST. The computer debug method 200 includes the following steps:

In step 210, a POST is started. Then, several function tests of the POST are executed respectively (step 220). Before the execution of each function test, a set of codes corresponding to each following executing function test is stored in a memory.

When an interrupt signal is received from an input device (step 230), make the POST interrupted (step 240). A key or button of the input device may be defined as an interrupt key or button, wherein the interrupt signal is generated to make the POST interrupted (step 240) when a user presses the interrupt key or button.

Then, wait for a user to input a guess signal through an input device (step 250) for comparing the set of stored codes in the memory with the guess signal. The input device may be a keyboard, a touch screen or any other input device. In the step 260, output a signal representing that if the set of stored codes in the memory equals to the guess signal or not. The signal representing that if the set of stored codes in the memory equals to the guess signal or not may be sound made by a speaker of the computer or a light generated by a light of a computer, such as a HDD light, a power light, a backlight module of a LCD or any other light of the computer.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A computer debug method, comprising:
    starting a Power-On Self Test (POST) for a computer;
    executing a plurality of function tests of the POST respectively;
    storing at least one set of codes corresponding to each following executing function test in a memory before executing each of the function tests;
    when the POST is interrupted, waiting for a user to input a guess signal through an input device;
    comparing the set of stored codes in the memory with the guess signal; and
    outputting a signal representing that the set of stored codes in the memory is equal to the guess signal and obtaining the information of which function of the computer is broken according to the guess signal if the set of stored codes in the memory equals to the guess signal.

2. The computer debug method of claim 1, further comprising:
    determining if the set of stored codes in the memory is larger or smaller than the guess signal if the set of stored codes in the memory is not equal to the guess signal;
    outputting a signal representing that the set of stored codes in the memory is larger than the guess signal if the set of stored codes in the memory is larger than the guess signal; and
    outputting a signal representing that the set of stored codes in the memory is smaller than the guess signal if the set of stored codes in the memory is smaller than the guess signal.

3. The computer debug method of claim 1, wherein the signal representing that the set of stored codes in the memory is equal to the guess signal is sound.

4. The computer debug method of claim 1, wherein the signal representing that the set of stored codes in the memory is equal to the guess signal is a light.

5. The computer debug method of claim 1, wherein the POST is interrupted when an error is detected by one of the function tests.

6. The computer debug method of claim 1, wherein the POST is interrupted when a device is determined broken by one of the function tests.

7. The computer debug method of claim 1, wherein the POST is interrupted when one of the function tests has been executed for more than a time limit.

8. The computer debug method of claim 1, wherein the POST is interrupted when an interrupt signal is received from the input device.

9. The computer debug method of claim 1, wherein the sets of codes corresponding to the function tests are POST Codes.

* * * * *